United States Patent Office 3,651,092
Patented Mar. 21, 1972

3,651,092
ISOMERIZATION PROCESS
Paul R. Stapp, Gerhard P. Nowack, and Marvin M. Johnson, Bartlesville, Okla., assignors to Phillips Petroleum Company
No Drawing. Filed May 25, 1970, Ser. No. 40,343
Int. Cl. C07d 5/10, 7/10
U.S. Cl. 260—345.1
24 Claims

ABSTRACT OF THE DISCLOSURE

Cyclic olefinically unsaturated ethers containing 4 to 5 ring carbon atoms are isomerized by contact with a catalyst containing nickel and arsenic in a hydrogen atmosphere. The isomerization reaction is favorably influenced by the presence of carbon monoxide. The isomerization products are useful solvents and intermediates for the preparation of useful chemicals such as polymers, polyfunctional alcohols and the like.

---

This invention relates to catalytic processes. More particularly, the invention relates to the isomerization of organic compounds, especially the isomerization of olefinically unsaturated cyclic ethers.

Cyclic unsaturated ethers such as the dihydrofurans and dihydropyrans are known chemical compounds useful, for example, as solvents per se, or as precursors for other valuable chemical compounds such as polymeric materials useful as lubricants, molding materials and adhesives, or monomeric materials such as polyhydric alcohols useful in the preparation of polyester and urethane resins, functional fluids, lube oil additives, antifreeze and the like.

The more active, and thus more valuable, of the dihydrofuran and dihydropyran compounds are those containing the olefinically unsaturated carbon-carbon bond in the alpha position to the oxygen atom, i.e., the 2,3-dihydrofuran and 3,4-dihydro-2-[H]pyran compounds. These alpha-unsaturated cyclic ethers readily enter into polymerizations and other reactions which yield desired and valuable products. The beta-unsaturated cyclic ethers such as the 2,5-dihydrofuran and the 3,6-dihydro-2-[H]pyran compounds only enter into such reactions with more difficulty, if at all.

The past limited availability of these compounds has restricted their use. Recently developed processes have improved their availability. However, these processes produce not only the more desirable alpha-unsaturated compounds but also significant quantities of the less desirable beta-unsaturated materials.

We have discovered, and quite unexpectedly, that the beta-unsaturted diyhdropyran and dihydrofuran compounds can be isomerized to the more desirable alpha-unsautrated compounds by contact with certain nickel- and arsenic-containing catalytic agents in the presence of hydrogen. We have further discovered that the presence of carbon monoxide together with hydrogen in the reaction zone can improve conversion and selectivity. This discovery was particularly surprising since it is known that dihydropyrans and dihydrofurans in the presence of hydrogen- and nickel-containing catalysts undergo rearrangement, e.g., to cyclic ketones, hydrogenation of the carbon-carbon double bond and hydrogenolysis of the ring.

In accordance with the present invention, 2,5-dihydrofuran and 3,6-dihydro-2-[H]pyran compounds are isomerized to the corersponding 2,3-dihydrofuran and 3,4-dihydro-2-[H]pyran compounds, respectively, in the presence of a catalyst comprising nickel and arsenic under an atmosphere of hydrogen. The novel isomerizations of the invention can be illustrated by the following equations:

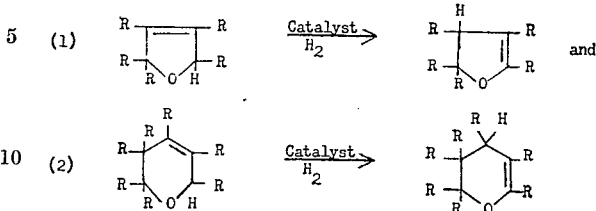

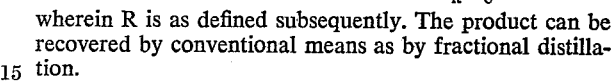

wherein R is as defined subsequently. The product can be recovered by conventional means as by fractional distillation.

The beta-unsaturated ethers containing 4 or 5 ring carbon atoms which comprise the starting materials for the process of the invention have the formulas:

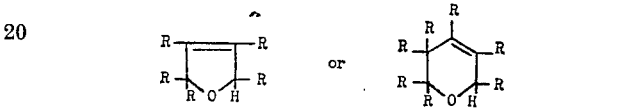

wherein R is hydrogen or an alkyl group having 1 to 10 carbon atoms, preferably from 1 to 4 carbon atoms, and the total number of carbon atoms of all R groups in each molecule does not exceed 20. Exemplary of the 2,5-dihydrofurans are 2,5-dihydrofuran,
2,5-didecyl-2,5-dihydrofuran,
2,2-di(3-methyl-4-ethylheptyl)-2,5-dihydrofuran,
3,4-di(3,3-diethylhexyl)-2,5-dihydrofuran,
2,2,3,4,5-pentabutyl-2,5-dihydrofuran,
2,2,4-trimethyl-2,5-dihydrofuran,
2-methyl-2,5-dihydrofuran and the like. Exemplary of the 3,6-dihydro-2-[H]dihydropyran compounds are 3,6-dihydro-2-[H]pyran,
2,6-didecyl-3,6-dihydro-2-[H]pyran,
2,2-di(3-methyl-4-ethylheptyl)-3,6-dihydro-2-[H]pyran,
3,4-di(3,3-diethylhexyl)-3,6-dihydro-2-[H]pyran,
2,2,3,3,4,5,6-heptaethyl-3,6-dihydro-2-[H]pyran,
2,3,4-trimethyl-3,6-dihydro-2-[H]pyran,
2-methyl-3,6-dihydro-2-[H]pyran and the like.

The products produced by the isomerization process of the invention are 2,3-dihydrofuran (from the 2,5-dihydrofuran) and 3,4-dihydro-2-[H]pyran (from the 3,6-dihydro-2-[H]pyran) compounds having the formula:

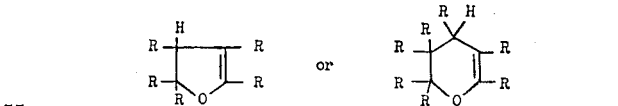

wherein R is as previously defined. Representative of such products are 2,3-dihydropyran,
2,5-didecyl-2,3-dihydrofuran,
2,2-di(3-methyl-4-ethylheptyl)-2,3-dihydrofuran,
3,4-di(3,3-diethylhexyl)-2,3-dihydrofuran,
2,2,3,4,5-pentabutyl-2,3-dihydrofuran,
2,2,4-trimethyl-2,3-dihydrofuran,
2-methyl-2,3-dihydrofuran,
3,4-dihydro-2-[H]pyran,
2,6-didecyl-3,4-dihydro-2-[H]pyran,
2,2-di(3-methyl-4-ethylheptyl)-3,4-dihydro-2-[H]pyran,
3,4--di(3,3-diethylhexyl)-3,4-dihydro-2-[H]pyran,
2,2,3,3,4,5,6-heptaethyl-3,4-dihydro-2-[H]pyran,
2,3,4-trimethyl-3,4-dihydro-3,4-dihydro-2-[H]pyran,
2-methyl-3,4-dihydro-2-[H]pyran
and the like.

The novel isomerizations of this invention are effected in the presence of catalytic agents containing nickel and arsenic. In its preferred form, the catalytic agent of this invention is a supported, reduced nickel arsenate. Such nickle-arsenic combinations as are suitable for use in the invention have the empirical formula $NiAs_x$, in which $x$ can have a value from about 0.33 to about 2, preferably 0.6 to 1, and include compounds such as $NiAs$, $NiAs_2$ and $Ni_3As_2$, the latter being particularly effective. The proportions of nickel and arsenic need not be stoichiometric; an excess of either nickel or arsenic can be present.

The catalytic agents can be employed in a nonsupported state, for example, in the form in which the principal components are coprecipitated from a gel. The catalytic agents are preferably supported on a carrier such as alumina, siilca, titania, carbon, diatomaceous earth, zirconia, various clays, calcium aluminate, natural and synthetic molecular sieves, zeolites, etc., and mixtures thereof. In general, the support material will have a surface area of about 1 to about 400 square meters per gram. A particularly preferred catalytic agent comprises alumina-supported nickel arsenide.

The nickel/arsenic-containing catalysts of the invention can be prepared by any means known in the art for preparation of catalysts in general. For example, the nickel and arsenic can be simultaneously deposited on the support as by precipitating nickel arsenate on the support or the support can be impregnated with nickel and arsenic in individual treatments. Any suitable carrier can be conventionally impregnated with inorganic compounds, including acids, ammonium salts, nitrates, halides and so forth of nickel and arsenic. For example, arsenic trioxide in an ammoniacal solution can be employed as an impregnant as can aqueous solutions of nickel nitrate and arsenic acid. Other suitable means of application such as mixing in a ball mill, plasma spraying, and the like can be employed.

In preparing the catalysts, sufficient nickel is employed to deposit about 0.1 to about 20, preferably from about 0.5 to about 10 weight percent nickel on the support and sufficient arsenic is employed so as to produce a finished catalyst containing from about 0.05 to about 50 weight percent, preferably 1.0 to about 20 weight percent arsenic. In general, the catalytic agents will comprise from about 5 to about 50, preferably 15 to 35, weight percent of nickel/arsenic, based on total weight of catalytic agent and carrier. In one embodiment, a catalytic agent consisting of 25 weight percent nickel arsenide and 75 weight percent alumina support was found to be quite beneficial in effecting the isomerizations of the invention.

Following deposition of the arsenic and nickel upon the support, the support can be washed to remove undesirable soluble salts, dried, calcined in air, and then reduced with hydrogen at a suitable temperature and pressure to produce the active nickel arsenide. For example, hydrogen reduction at atmospheric pressure at 250° to 450° C. for 0.1 to 20 hours can be used. In some instances, the calcination step can be omitted. In one embodiment, a nickel arsenide catalyst is prepared by depositing on an alumina support nickel and arsenic from aqueous solutions of nickel nitrate and arsenic acid, respectively. The pH of the solution is adjusted to precipitate nickel arsenate. The composite catalytic agent is washed, dried and calcined in air at about 538° C. for a time sufficient to convert the nickel arsenate to nickel arsenide. Treatment of the finished catalyst with hydrogen at an elevated temperature is presently beileved to be very desirable for satisfactory activity of the catalyst.

The catalysts of the present invention, while promoting the desired double bond migration, do not appreciably promote hydrogenation or ring fission reactions. Nonacidic supports are preferred for the catalytic agents of this invention. Accordingly, ammoniacal solutions or basic precipitants are preferentially employed in preparing the catalyst.

The catalysts of this invention can be regenerated by known methods such as by calcination in the presence of an oxygen-containing atmosphere, e.g., calcination in an atmosphere comprising 3–5 volume percent molecular oxygen with the remainder being inert gases such as nitrogen, helium, carbon dioxide and the like. Inasmuch as the reaction conditions to which these catalysts are subjected are relatively mild, catalyst regeneration can be primarily directed to the removal of carbonaceous deposits. Accordingly, regeneration can be effected by removing such deposits by oxidation or by washing with a liquid aromatic solvent under conditions suitable for removing the deposits. Preferably, benzene, toluene, xylene or mixtures thereof can be passed through the catalyst bed at a temperature such as 100–120° C., and thereafter flushing the bed with warm hydrogen or an inert gas such as nitrogen or helium.

The process of the invention can be effected in either a batchwise on continuous manner. A continuous mode of operation is preferred. Under conditions of continuous operation, liquid hourly space velocities (LHSV) in the range of 0.5–5 grams of reactant per gram of catalyst per hour are normally suitable.

The process can be operated over a broad range of conditions and pressure. In general, the isomerization process is effected at temperatures in the range of about 200° to 300° C., and pressures in the range of atmospheric to 1000 p.s.i.g. In the isomerization of 2,5-dihydrofuran compounds to the corresponding 2,3-dihydrofuran compounds, the process is preferably effected at temperatures in the range of 200° to 240° C. and pressures in the range of atmospheric to 400 p.s.i.g. Especially preferred conditions include a temperature in the range of 205° to 230° C. and pressures in the range of 200 to 400 p.s.i.g. For isomerization of 3,6-dihydro-2-[H]pyran compounds to the corresponding 3,4-dihydro-2-[H]pyran compounds, the process is preferably effected at temperatures of 200° to 300° C. and pressures in the range of atmospheric to 400 p.s.i.g. Especially preferred conditions include a temperature in the range of 250° to 275° C. and pressures in the range of 200 to 300 p.s.i.g.

The process of the invention is effected in the presence of at least some hydrogen. In general, a gaseous atmosphere is employed which contains at least one volume percent hydrogen. The remainder of the gaseous atmosphere can comprise gases such as nitrogen, helium, neon, argon, kryton, xenon, carbon dioxide, carbon monoxide, methane, ethane, propane and the like. Preferably, hydrogen is introduced at a rate which provides a hydrogen to cyclic ether feed molar ratio in the range of 0.1–5:1. Preferably, the reactions of this invention are effected in the presence of a gaseous atmosphere comprising carbon monoxide and hydrogen. Generally, the volume ratio of hydrogen to carbon monoxide is in the range of 2–999:1, preferably 2–100:1. The carbon monoxide can be introduced with the feedstock, with the hydrogen or as a separate stream.

The isomerization reactions of the invention can be effected with or without diluent materials, although the use of a diluent material is preferred. Any diluent is suitable which does not deleteriously affect the isomerization reactions. Suitable diluents include alkanes and cycloalkanes such as hexane, heptane, decane, cyclohexane and cyclooctane. The diluents can comprise up to and including 98 weight percent of the admixture of diluent and cyclic ether feed. Preferably, the diluent comprises from 75 to 95 percent of the admixture.

The 2,3-dihydrofuran and 3,4-dihydro-2-[H]pyran compounds which are prepared according to the process of this invention are well known compositions having utility as chemical intermediates, solvents and the like. For example, these materials polymerize readily to liquid and solid polymers useful as lubricants and molding materials. These materials react with alcohols to form the corresponding substituted tetrahydrofurans and tetrahydropyrans and are useful intermediates for the preparation of Grignard reagents.

The following examples are illustrative of the invention. Example I provides a representative method of preparing a suitable catalyst. Examples II and III describe representative isomerization processes according to the invention.

EXAMPLE I

Catalyst preparation

A mixture comprising 98.5 grams of nickel nitrate [Ni(NO$_3$)$_2$·6H$_2$O] in 1200 mls. of water is slurried with 150 grams of alumina. An aqueous solution of 32.1 grams of arsenic acid (H$_3$AsO$_4$) in 300 mls. of water is added to the slurry. The pH of the slurry is adjusted to about 7 by adding a solution of ammonia and water (14% NH$_3$), and nickel arsenate is precipitated. The precipitate is separted by filtration, washed with water, and refiltered. The precipitate is dried at 100° C. for 16 hours. The dry precipitate is heated in air at 538° C. for 30 minutes, cooled, ground, and sieved. The resulting nickel arsenide-on-alumina catalyst is ready for use.

EXAMPLE II

Using a portion of the catalyst composite of Example I, a stainless steel tube reactor having an internal diameter of 1 inch is packed with 7 inches of 3 ml. diameter glass beads, 2¾ inches (8.6 g.) of catalyst composite and with more glass beads. The portion of the tube reactor containing the catalyst is enclosed in a thermostated furnace. A series of runs is effected according to the process of the invention wherein hydrogen containing 2 volume percent carbon monoxide and a mixture comprising 10 weight percent 2,5-dihydropyran and 90 weight percent cyclohexane are charged to the reactor. Prior to the runs, the catalyst is treated with hydrogen at 371° C. for about 16 hours. The results of these runs are reported in Table I.

TABLE I

| Run No. | 1 | 2 | 3 | 4 | 5 | 6 |
|---|---|---|---|---|---|---|
| Pressure, p.s.i.g. | 100 | 200 | 400 | 400 | 400 | 400 |
| Temperature, ° C. | 209 | 209 | 210 | 220 | 238 | 276 |
| Liquid feed rate, ml./hr.ᵃ | 22 | 32 | 29 | 29 | 30 | 28 |
| Gas feed, l./hr.ᵇ | 33 | 44 | 32 | 35 | 34 | 34 |
| Product distribution, mol percent: | | | | | | |
| 2,3-dihydrofuran | 50 | 60 | 65 | 40 | 10 | |
| 2,5-dihydrofuran | 50 | 30 | 10 | 5 | | |
| Tetrahydrofuran | 2 | 5 | 20 | 30 | 45 | 15 |
| Butanal | 1 | 1 | 10 | 15 | 30 | 25 |
| Butanol | | | | 5 | 15 | 60 |

ᵃ 10 weight percent 2,5-dihydrofuran in cyclohexane.
ᵇ 2 volume percent carbon monoxide in hydrogen.

This example demonstrates the isomerization of 2,5-dihydrofuran to 2,3-dihydrofuran according to the process of this invention.

EXAMPLE III

A stainless steel tube reactor having an internal diameter of 1 inch is packed with 12½ inches of glass beads, 4⅞ inches of a catalytic mixture comprising 50.8 grams of 10–20 mesh alumina and 2.6 g. of the nickel arsenide-on-alumina catalyst composite prepared in Example I, and then with more glass beads. The portion of the tube reactor containing the catalyst is enclosed in a thermostated furnace. A series of runs is effected according to the process of the invention wherein hydrogen and a mixture comprising 10 weight percent of 3,6-dihydro-2-[H]pyran and 90 weight percent cyclohexane are charged to the reactor. Prior to the runs, the catalyst is treated with hydrogen at 371° C. for about 16 hours. The results of these runs are reported in Table II.

TABLE II

| Run No. | 7 | 8 | 9 | 10 | 11 |
|---|---|---|---|---|---|
| Pressure, p.s.i.g. | 300 | 300 | 200 | 200 | 200 |
| Temperature, ° C. | 260 | 288 | 260 | 204 | 191 |
| Liquid feed, ml/hr.: | | | | | |
| 3,6-dihydro-2-[H]pyran | 1.8 | 1.5 | 2.6 | 2.1 | 1.6 |
| Cyclohexane | 16.8 | 13.5 | 22.6 | 21 | 10 |
| Hydrogen rate, ft.³/hr. | 0.80 | 0.80 | 0.80 | 0.80 | 0.80 |
| Conversion ᵃ | 100 | 100 | 100 | 28 | 1.2 |
| Selectivity ᵇ | 60 | 20 | 69 | 22 | 1.2 |

ᵃ Mol percent of 3,6-dihydro-2-[H]pyran converted to any product.
ᵇ Mol percent of 3,6-dihydro-2-[H]pyran converted to 3,4-dihydro-2-[H]pyran.

This example demonstrates the isomerization of a 3,6-dihydro-2-[H]pyran to a 3,4-dihydro-2-[H]pyran according to the process of this invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:
1. The process which comprises contacting a compound having the formula

respectively, with a catalytic material comprising nickel and arsenic in the presence of hydrogen under isomerization conditions and obtaining a compound having the formula

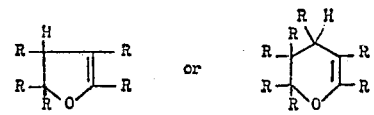

respectively; wherein R is hydrogen or an alkyl radical having from 1 to 10 carbon atoms and wherein the total carbon atoms of all R substituents does not exceed 20.

2. The process of claim 1 wherein said catalytic material comprises a nickel arsenide having the formula NiAs$_x$, wherein $x$ has a value in the range of 0.33 to 2.

3. The process according to claim 1 which comprises contacting a compound having the formula

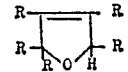

with a catalytic material comprising nickel and arsenic in the presence of hydrogen under isomerization conditions and obtaining a compound having the formula

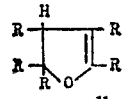

wherein R is hydrogen or an alkyl radical having from 1 to 10 carbon atoms and wherein the total number of carbon atoms of all R substituents does not exceed 20.

4. A process according to claim 3 wherein said isomerization is effected at a temperature in the range of 200° to 240° C. and a pressure in the range of atmospheric to 400 p.s.i.g. and the catalytic material comprises a compound having the formula NiAs$_x$, wherein $x$ has a value in the range of 0.33 to 2.

5. A process according to claim 4 wherein said catalytic material includes a support.

6. A process according to claim 5 wherein said catalytic material contains from about 0.1 to about 20 weight percent nickel and from about 0.05 to about 50 weight percent arsenic, based on total weight of catalyst and support.

7. A process according to claim 6 wherein said catalytic material comprises from about 5 to about 50 weight percent nickel arsenide, based on total weight of catalyst and support.

8. A process according to claim 7 wherein said catalytic material comprises from 15 to 35 weight percent of nickel arsenide.

9. A process according to claim 8 wherein said feed material is 2,5-dihydrofuran, said product is 2,3-dihydrofuran, said catalytic material comprises 25 weight percent nickel arsenide and 75 weight percent alumina, said temperature is in the range of 205° to 230° C. and said pressure is in the range of 100 to 400 p.s.i.g.

10. A process according to claim 4 wherein said contact is effected in the presence of hydrogen and carbon monoxide.

11. A process according to claim 10 wherein said catalytic material includes a support and contains from about 0.1 to about 20 weight percent nickel and from about 0.05 to about 50 weight percent arsenic, based on total weight of catalyst and support.

12. A process according to claim 11 wherein said catalytic material comprises from about 5 to about 50 weight percent nickel arsenide, based on total weight of catalyst and support.

13. A process according to claim 9 wherein said contact is effected in the presence of hydrogen and carbon monoxide.

14. A process according to claim 1 for preparing a compound having the formula

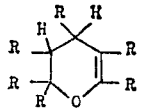

which comprises contacting a compound having the formula

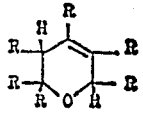

wherein R is hydrogen or an alkyl radical having up to 10 carbon atoms and the total number of carbon atoms in all R substituents does not exceed 20; with a catalytic material comprising nickel and arsenic under isomerization conditions in the presence of hydrogen.

15. A process according to claim 14 wherein said isomerization is effected at a temperature in the range of 200° to 300° C. and a pressure in the range of atmospheric to 400 p.s.i.g. and the catalytic material comprises a compound having the formula $NiAs_x$, wherein $x$ has a value in the range of 0.33 to 2.

16. A process according to claim 15 wherein said catalytic material includes a support.

17. A process according to claim 16 wherein said catalytic material contains from about 0.1 to about 20 weight percent nickel and from about 0.05 to about 50 weight percent arsenic, based on total weight of catalyst and support.

18. A process according to claim 17 wherein said catalytic material comprises from about 5 to about 50 weight percent nickel arsenide, based on total weight of catalyst and support.

19. A process according to claim 18 wherein said catalytic material comprises from 15 to 35 weight percent of nickel arsenide.

20. A process according to claim 19 wherein said feed material is 3,6-dihydro-2-[H]pyran, said product is 3,4-dihydro-2-[H]pyran, said catalytic material comprises 25 weight percent nickel arsenide and 75 weight percent alumina, said temperature is in the range of 250° to 275° C. and said pressure is in the range of 200 to 300 p.s.i.g.

21. A process according to claim 15 wherein said contact is effected in the presence of hydrogen and carbon monoxide.

22. A process according to claim 21 wherein said catalytic material includes a support and contains from about 0.1 to about 20 weight percent nickel and from about 0.05 to about 50 weight percent arsenic, based on total weight of catalyst and support.

23. A process according to claim 22 wherein said catalytic material comprises from about 5 to about 50 weight percent nickel arsenide, based on total weight of catalyst and support.

24. A process according to claim 20 wherein said contact is effected in the presence of hydrogen and carbon monoxide.

References Cited
UNITED STATES PATENTS 2,858,322  10/1958  Kubler et al. _____ 260—345.1

JOHN M. FORD, Primary Examiner

U.S. Cl. X.R.

260—346.1